US012774718B2

(12) United States Patent
Türker

(10) Patent No.: US 12,774,718 B2
(45) Date of Patent: Oct. 27, 2026

(54) SLIDING BEARING ARRANGEMENT AND LINEAR CARRIAGE HAVING A LOCKING BRAKE

(71) Applicant: igus SE & Co. KG, Cologne (DE)

(72) Inventor: Muhammet Erkam Türker, Nörvenich (DE)

( * ) Notice: Subject to any disclaimer, the term of this patent is extended or adjusted under 35 U.S.C. 154(b) by 447 days.

(21) Appl. No.: 18/286,110

(22) PCT Filed: Apr. 8, 2022

(86) PCT No.: PCT/EP2022/059517
§ 371 (c)(1),
(2) Date: Oct. 30, 2023

(87) PCT Pub. No.: WO2022/218877
PCT Pub. Date: Oct. 20, 2022

(65) Prior Publication Data

US 2024/0200596 A1 Jun. 20, 2024

(30) Foreign Application Priority Data

Apr. 12, 2021 (DE) ..................... 20 2021 101 950.6

(51) Int. Cl.
*F16C 29/10* (2006.01)
*B23Q 1/28* (2006.01)
(Continued)

(52) U.S. Cl.
CPC ................ *F16C 29/10* (2013.01); *B23Q 1/28* (2013.01); *F16C 29/02* (2013.01); *F16D 63/006* (2013.01)

(58) Field of Classification Search
CPC . F16C 29/02; F16C 29/10; B23Q 1/28; B23Q 1/285; F16D 63/00; F16D 63/006
(Continued)

(56) References Cited

U.S. PATENT DOCUMENTS 2,540,289 A * 2/1951 Randall .................. B23B 29/06 82/158
2,598,986 A * 6/1952 Fegley .................. D04B 15/64 66/126 R
(Continued)

FOREIGN PATENT DOCUMENTS

CH 154592 A 5/1932
CN 86108927 A 11/1987
(Continued)

OTHER PUBLICATIONS

European Patent Office, English translation of the Written Opinion for PCT App. No. PCT/EP2022/059517, Oct. 12, 2023, pp. 1-5.
(Continued)

*Primary Examiner* — Thomas J Williams
(74) *Attorney, Agent, or Firm* — Cahn & Samuels, LLP

(57) ABSTRACT

A sliding bearing arrangement (1) includes a rail (10) and a carriage (20). The rail (10) includes a rail body (11) extending in a longitudinal direction (X) with two cylindrical guide portions (12, 13) extending in the longitudinal direction (X) and spaced apart from one another in a transverse direction. The carriage (20) includes a carriage body (21) extending in the transverse direction along the rail body (11), on which carriage body are provided bearing elements (28) which are each associated with one of the guide portions (13). The carriage (20) also includes a holding portion (22) with a bearing (23) in which a pivot axle (23) of a pivot lever (24) is borne. The pivot lever (24) being pivotable out of a first position into a second position with a pivoting movement through at least 45° about the pivot axle. The pivot lever (24) having at one side of the pivot axle (23) a pressure application portion and at the other side an actuating portion. The pressure application portion (25) in the first position presses with a pressure application side (29) on a surface of the first guide portion (12) and inhibits the displacement of the
(Continued)

Figure 1:
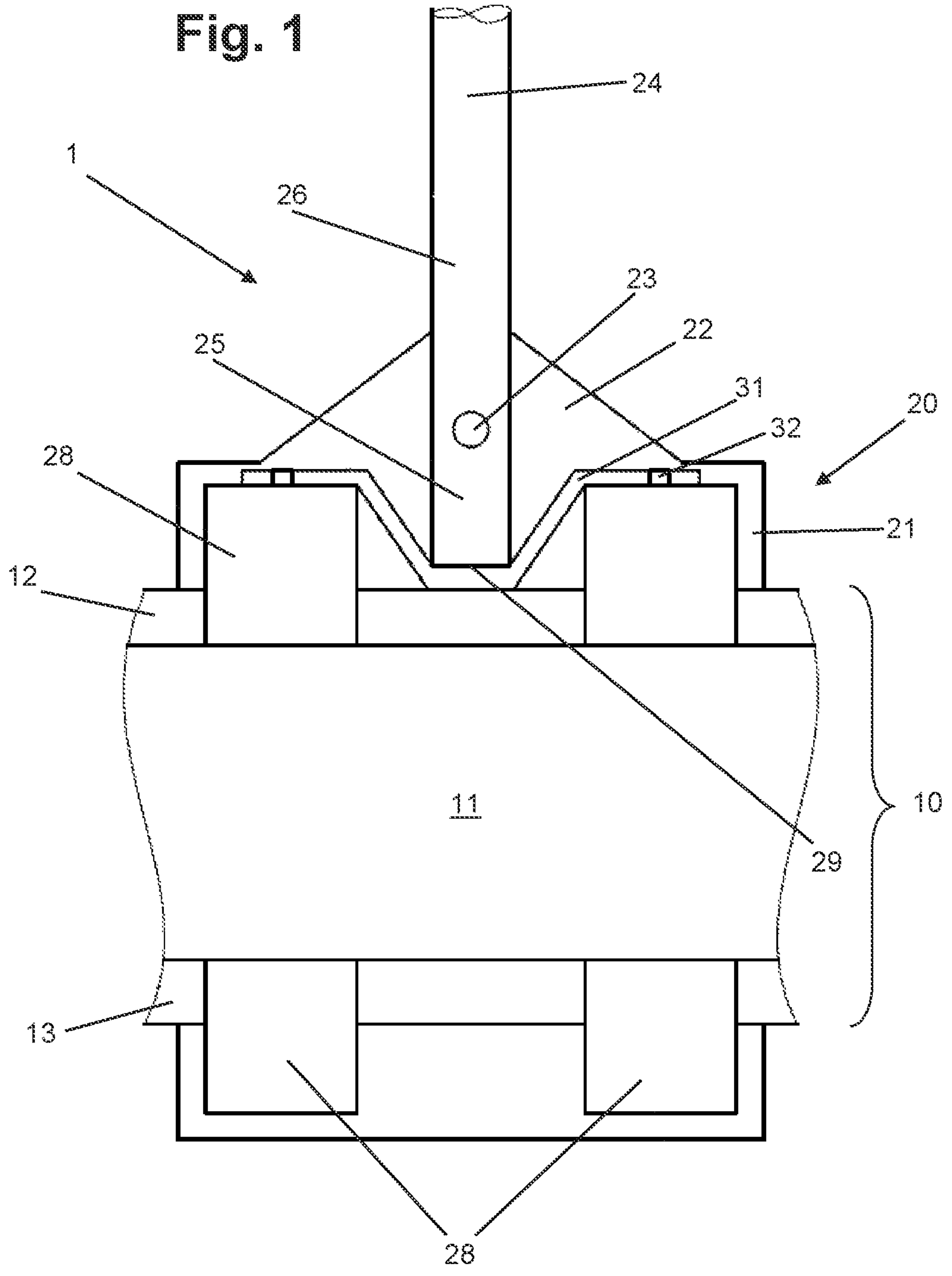

carriage, and in the second position is detached from the surface of the first guide portion (12).

20 Claims, 3 Drawing Sheets

(51) Int. Cl.
*F16C 29/02* (2006.01)
*F16D 63/00* (2006.01)

(58) Field of Classification Search
USPC ........................................................ 188/67, 62
See application file for complete search history.

(56) References Cited

U.S. PATENT DOCUMENTS

| | | | | |
|---|---|---|---|---|
| 4,738,156 | A * | 4/1988 | Pipon | F16B 2/185<br>297/375 |
| 5,460,452 | A | 10/1995 | Hara | |
| 5,732,799 | A | 3/1998 | Chikamatsu et al. | |
| 6,953,282 | B2 * | 10/2005 | Okabe | F16C 33/201<br>384/42 |
| 2017/0314610 | A1 | 11/2017 | Nishinakama | |
| 2024/0200596 | A1 * | 6/2024 | Türker | F16C 29/10 |
| 2024/0392831 | A1 * | 11/2024 | Köching | F16C 29/004 |

FOREIGN PATENT DOCUMENTS

| | | | | |
|---|---|---|---|---|
| DE | 350350 | C | 3/1922 | |
| DE | 1 575 282 | B1 | 5/1971 | |
| DE | 93 03 995 | U1 | 6/1993 | |
| DE | 94 17 944 | U1 | 1/1995 | |
| DE | 10 2007 045 236 | A1 | 4/2009 | |
| DE | 20 2009 004 368 | U1 | 8/2009 | |
| EP | 2813723 | A2 | 12/2014 | |
| JP | H0665617 | U * | 9/1994 | F16C 29/064 |
| JP | 2010-255849 | A | 11/2010 | |

OTHER PUBLICATIONS

European Patent Office, International Search Report for PCT App. No. PCT/EP2022/059517, Aug. 19, 2022, pp. 1-3.
European Patent Office, Written Opinion for PCT App. No. PCT/EP2022/059517, Aug. 19, 2022, pp. 1-6.
Deutsches Patent-und Markenamt, Examination Report for DE App. No. 20 2021 101 950.6, Aug. 25, 2021, pp. 1-8.
European Patent Office, Espacenet, English abstract for JP 2010255849A, Sep. 20, 2023.
Taiwan Intellectual Property Office, Office Action for TW 111113790, Sep. 17, 2025, pp. 1-5.
China National Intellectual Property Administration, Office Action for Application No. 202280035056.3, Mar. 20, 2026, pp. 1-7.

* cited by examiner

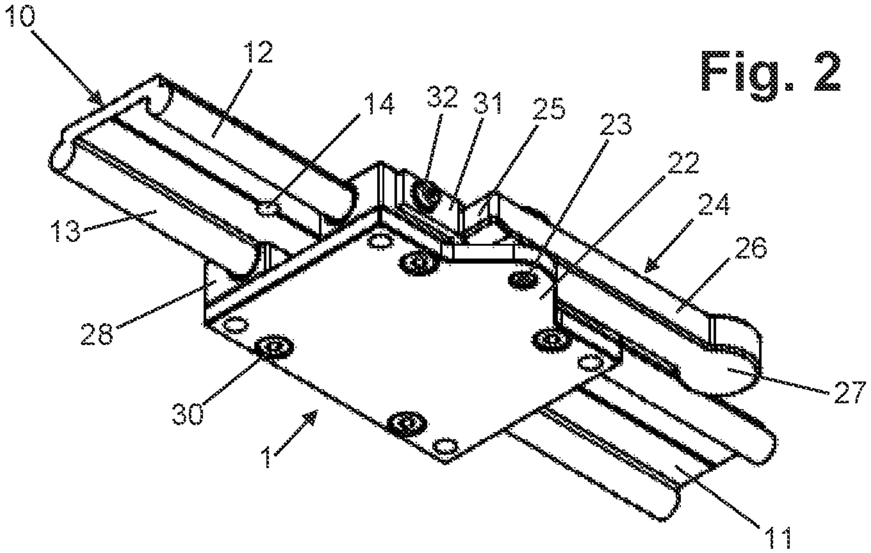
Fig. 2
Fig. 3
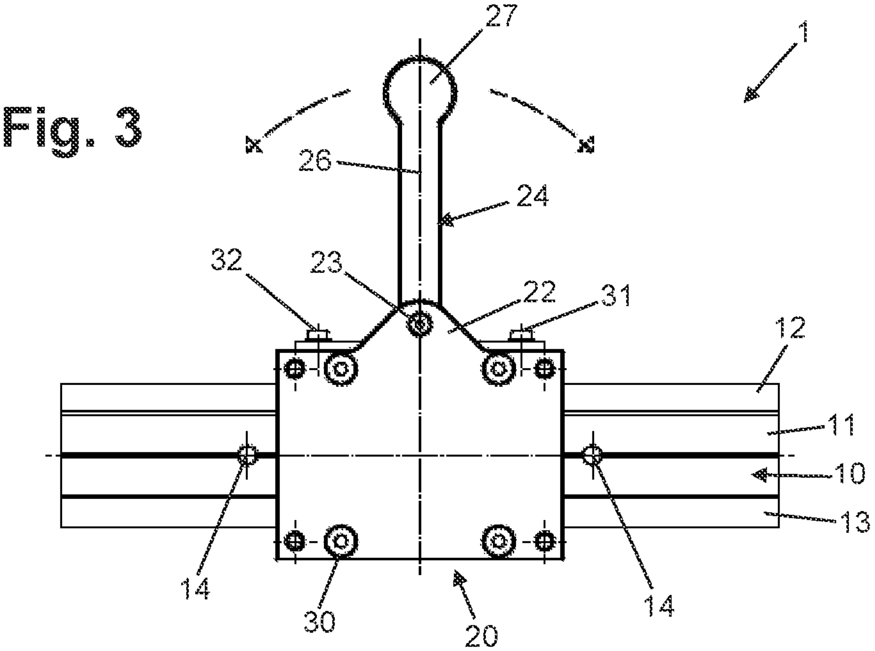

SLIDING BEARING ARRANGEMENT AND LINEAR CARRIAGE HAVING A LOCKING BRAKE

The invention relates to a linear sliding bearing arrangement having a rail extending in a longitudinal direction, a carriage sliding thereon and a locking brake, and also a carriage.

Sliding bearing arrangements of this type have many uses in mechanical engineering, for example if repeated displacement of components and subassemblies between different positions is necessary. Such displacement may take place, for example, by mechanical drives, for instance automatically controlled, or alternatively, for example in the case of conversion work, manually. In this case, it is often desired to lock the carriage in a particular position on the rail.

In a known sliding bearing system with ball bearing bushings (2DA QuickSlide System with brake, Thomson, Radford VA, USA), a clamping body arranged in a recess in the rail body between the guide portions and fastened to the carriage can be pivoted about the longitudinal axis of the carriage such that it is wedged in the recess. In so doing, no forces which might place an additional load on the ball bearings or deform the carriage body should occur. With this design, the flexibility of the design for the rail body is restricted, since a continuous recess has to be present. Furthermore, operation of the clamping body is difficult and dangerous, because it has to take place in the region of movement of the carriage.

A clamping element for fastening to profile rail guides, having a housing, a handle and a clamping block, is likewise available on the market (Zimmer GROUP GmbH, Rheinau, DE). The housing can be placed on the profile rail, so that the handle is located outside the region of movement of a carriage guided by the profile rail. By turning the handle, a portion of the profile rail can be clamped in between the housing and the clamping block. This clamping element can, however, be used only in addition to a carriage guided by the profile rail, and can be activated only by time-consuming turning of the handle.

The object of the invention is to provide a carriage and a sliding bearing arrangement in which the carriage can be fixed to or detached again from the rail with a simple hand movement, if possible without additional forces applying a load to the bearing faces, or without additional components being necessary.

This object is achieved by a sliding bearing arrangement in accordance with the main claim.

The sliding bearing arrangement according to the invention comprises a rail and a carriage. The rail has a rail body extending in a longitudinal direction, on which are provided two cylindrical guide portions extending in the longitudinal direction and spaced apart from one another in a transverse direction. Preferably, the rail and the guide portions are formed to be elongate in the longitudinal direction. The cylinder axes of the guide portions run in the longitudinal direction. The transverse direction is perpendicular to the longitudinal direction. Preferably, the guide portions are arranged at those two longitudinal sides of the rail body which extend along the longitudinal direction and form one end of the rail body in the transverse direction. The guide portions each are connected to the rail body by way of a connection region. The connection region may be formed, in particular, as a ridge which preferably runs continuously, in particular uninterruptedly, in the longitudinal direction between the rail body and the respective guide portion. The carriage has a carriage body extending in the transverse direction along the rail body. Preferably, the carriage body spans the rail body in the transverse direction. At the carriage body there are provided bearing elements, of which at least one is associated with a first one of the guide portions and at least one further one is associated with a second one of the guide portions. The first and second guide portions are the two cylindrical guide portions of the rail extending in the longitudinal direction in the transverse direction from each other. The bearing elements each have a cylindrical leadthrough, corresponding to the guide portion which is associated with them, with a longitudinal gap to allow the connection region to pass through. The leadthroughs are formed, corresponding to the guide portion which is respectively associated, in such a way that the associated guide portion in the normal operation state of the sliding bearing arrangement, in which it is used regularly, is arranged in the leadthrough and the leadthrough encloses the guide portion at least in portions, so that the guide portion can slide along the carriage in the longitudinal direction guided in the leadthrough. Preferably, the leadthrough encloses the cylinder axis of the associated guide portion over an angular range of at least 200°, in particular at least 220°, in particular at least 240°, in particular at least 260°. The longitudinal gap is provided at that point at which the leadthrough does not enclose the cylinder axis of the guide portion. In the leadthroughs are arranged sliding elements which in the respective leadthrough form a sliding contact face which in the mounting position lies against the guide portion associated therewith. The guide portion thus lies with a peripheral portion against the sliding contact face formed by the sliding element which is arranged in the associated leadthrough. Preferably, the sliding element encompasses the guide portion over an angular range of at least 200°, in particular at least 220°, in particular at least 240°, in particular at least 260°, about its cylinder axis.

According to the invention, a first one of the bearing elements is associated with the first guide portion, the carriage having a holding portion which is provided with a bearing in which the pivot axle of a pivot lever is borne. The pivot lever can be arranged in a first and in a second position, the pivot lever being pivotable out of the first position into the second position with a pivoting movement through at least 45°, in particular through at least 60°, in particular through 90°, about the pivot axle. The pivot lever has at one side of the pivot axle a short portion formed as a pressure application portion, and at the other side of the pivot axle a long portion formed as an actuating portion. The actuating portion is preferably at least three times, in particular at least five times, as long as the pressure application portion, as a result of which a beneficial lever effect can be provided. The pressure application portion is arranged offset in the longitudinal direction relative to the first bearing element, and by the pivoting movement is movable with regard to the longitudinal direction beside, i.e. offset, the first bearing element and in the first position of the pivot lever presses with a pressure application side on a surface of the first guide portion and in so doing inhibits the displacement of the carriage relative to the rail, and in the second position of the pivot lever is detached from the surface of the guide portion. In that the pressure application portion is arranged offset in the longitudinal direction relative to the first bearing element, i.e., at least offset to the leadthrough provided in the first bearing element, the pressure application portion can press with its pressure application side against the surface of the guide portion. While in the first position the pivot lever and hence the entire carriage is wedged relative to the rail by the pressing of the pressure application side against the surface of the first guide portion, in the second position the pressure application portion with its pressure application side is detached from the surface of the guide portion, i.e., is not in a positive form fit or frictional connection with the surface of the first guide portion. The pivot lever is preferably fixed in position relative to the bearing elements and to the carriage body by the bearing with its pivot axle in the longitudinal direction. The pivot lever is preferably formed as a rigid body, in particular in the manner of a rod. Preferably, the holding portion at which the bearing is held is arranged offset in the longitudinal direction relative to the first bearing element. Preferably, the pivot axle is arranged offset in the longitudinal direction relative to the first bearing element. The holding portion is connected rigidly to the carriage body and the first bearing element.

Particularly preferably, the carriage has a second bearing element which is arranged at the carriage body spaced apart from the first bearing element in the longitudinal direction and likewise is associated with the first guide portion, the pressure application portion being provided in the longitudinal direction between the first and second bearing elements and the pressure application portion being movable by a pivoting movement between the two bearing elements which are spaced apart in the longitudinal direction. Owing to the arrangement of the pressure application portion in the longitudinal direction between the two bearing elements, particularly good absorption of force by the bearing elements in the transverse direction can be guaranteed if the pivot lever is brought from the second position into the first position by a pivoting movement inverse to the pivoting movement. Preferably, the holding portion, in particular the pivot axle, is arranged in the longitudinal direction between the first and second bearing elements.

Preferably, the surface of the first guide portion against which the pressure application side of the pivot lever presses in the first position is a longitudinal side, i.e., extending in the longitudinal direction, pointing in the transverse direction, of the guide portion, which longitudinal side points away from the other of the guide portions. Thus, the pressure application side presses against the surface of the guide portion from outside, preferably in the transverse direction, in the first position. Particularly preferably, the pivot axle is arranged in the transverse direction outside the rail. By arranging the pivot axle in the transverse direction outside the rail and/or by the pressing against the longitudinal side of the first guide portion pointing in the transverse direction, which longitudinal side points away from the second guide portion, a particularly simple, efficient and easily regulatable application of force by the pivot lever to the surface of the first guide portion can be guaranteed.

Particularly preferably, the pivot lever in the first position is oriented perpendicularly to the first guide portion and in the second position is oriented parallel to the first guide portion, being geared in each case to the cylinder axis of the cylindrically formed first guide portion. This may bring with it firstly a particularly simple application of force to the pivot lever and particularly simple accessibility of the pivot lever, and secondly particularly simple marking of the two positions.

It has been found that the wedging of the carriage with the rail instead of the rail body can also take place from outside in relation to the guide portion. As a result, the flexibility of design for the rail body is maintained, so that even particularly flat designs are possible, because no recess for a clamping body is necessary.

The invention can be applied to all generic sliding bearing arrangements, in particular if the sliding elements attached in the leadthroughs consist of a low-friction plastics material. It is however also possible to use conventional ball bearing bushings.

A "low-friction plastics material" is to be understood here to mean a polymeric material which has a low coefficient of friction in relation to the surface of the guide portion. In particular, this includes the thermoplastics polythene, polypropylene, polyacetal, polycarbonate, polyamide, polyvinyl chloride, polytetrafluoroethylene, and also phenol resins in the case of the thermoset plastics. To further reduce the friction, these plastics materials may contain fine-particle solid lubricants such as molybdenum disulphide or graphite. Such polymers are also referred to as tribopolymers. Since along with the friction also the wear and also the abrasion become less, these products are particularly suitable if a high degree of purity is important, such as, for example, in the foodstuffs industry and the semiconductor industry, and also in biochemical and microbiological applications. The polymeric materials may further contain fillers and fibrous materials, for example made of plastics material or textile, to improve the mechanical properties.

In the connection region, the cylindrical guide portion may merge directly into the rail body or alternatively be configured as a land connecting both parts. In order to make the linear movement of the bearing elements on the guide portions of the rail possible, the cylindrical leadthrough of the bearing element has a longitudinal gap in the cylinder surface, through which gap the connection region between the rail body and guide portion can pass. If this gap is wide enough, it can also serve for mounting the individual bearing elements on the guide portions by placing them on from the side, the bearing elements after this mounting step being connected securely to the carriage body, so that they cannot drop off the guide portions.

The bearing elements are preferably, in particular in the vicinity of the corners, located at that side of the carriage body which faces the rail. Whereas just for reasons of space preferably two bearing elements are provided at that side of the carriage body on which the holding portion for the pivot axle is located in order to make space between them for the movement of the short portion of the pivot lever, preferably also only one bearing element may be provided, for example, on the other side of the carriage body.

The holding portion of the carriage body is preferably formed as a projection, for example as a triangle, rectangle or trapezium, or with an arcuate margin, being configured such that the pivot bearing is located at the correct point and stability is guaranteed. The holding portion is preferably formed in one piece with the carriage body. It may, however, also be connected subsequently as a separate component to the carriage body and/or at least one of the bearing elements, in particular to both bearing elements associated with the first guide portion, which can make it possible to retrofit existing sliding bearing arrangements in relation to one embodiment of the invention.

The pressure of the short portion of the pivot lever on the first guide portion can be applied by direct contact. In one preferred embodiment, an elastic element is provided in the transverse direction between the pressure application portion of the pivot lever and the surface of the guide portion. The elastic element may be fastened, for example, to the carriage body and/or the first bearing element, in particular to the first and second bearing element, and extends in the longitudinal direction beyond the pressure application portion between the pressure application portion and the aforementioned surface of the first guide portion. Preferably, the elastic element is fastened at the two bearing elements which are spaced apart in the longitudinal direction between which the pressure application portion is arranged and spans the space between the bearing elements and the pressure application side of the pressure application portion of the pivot lever. Providing the elastic element makes it possible to compensate for an undersize between the pressure application side of the pivot lever and the surface of the guide portion. By fastening the elastic element to the first and second bearing element in such a way that it is spaced apart from the surface of the guide portion in the second position of the pivot lever, a particularly advantageous elastic effect can be achieved. By having a slight planned undersize, it is possible to avoid an oversize occurring and the pivot lever being able to be moved into the first position only with great force, which in turn would mean a risk of breaking and/or abrasion.

An embodiment in which the elastic element is fastened to the pressure application portion of the pivot lever at the pressure application side is also preferred.

The elastic element is preferably produced from an elastomer and may be in the form of a foil. For example, ethylene/propylene/diene copolymers and styrene/butadiene rubber are suitable. Advantageously, this elastomer comprises a friction-increasing addition, for example silicon dioxide or glass microspheres. This addition may be present in a surface layer facing the guide portion, or alternatively also in the entire volume of the elastic element.

Generally, preferably the elastic element is fastened to the first and in particular the second bearing element and/or to the carriage body in such a way that in the second position it is in a starting position and is elastically deflected by the pressure application portion of the pivot lever during the pivoting movement, until the pressure application portion presses the elastic element in the first position against the surface of the first guide portion. In the first position, the elastic element thus preferably exerts a restoring force along the transverse direction against the pressure application portion of the pivot lever. Upon the pivoting movement from the first position to the second position, the elastic element preferably detaches from the surface of the first guide portion owing to the elastic restoring force, while the pivot lever is moved from the first into the second position.

The material of the carriage, i.e., of the carriage body and the bearing elements, may be a metal, preferably a lightweight metal such as aluminum or titanium, or a plastics material, preferably a thermoplastic material, particularly preferably one from the above-mentioned group of low-friction plastics materials. In the latter case, the bearing elements may consist completely of the low-friction plastics material. It is also preferably possible to provide separate sliding elements made of low-friction plastics material or tribopolymer in the bearing elements made of plastics material. Such sliding elements are arranged on the inner face of the cylindrical leadthrough and thus fill up the gap between the guide portion and the body of the bearing element and in so doing form a sliding contact face, against which the guide portion which is received in the leadthrough lies.

Preferably, the bearing elements are fastened detachably, in particular with screws, to the carriage body. This may be done once they have been pushed onto the guide portions from their ends. Alternatively, it is also possible to make the bearing elements in one piece with the carriage body, optionally also with the holding portion or projection, if the conditions of mounting permit. Sliding elements which are provided can be integrated by insert injection molding into the bearing elements, optionally also into the corresponding portion of the one-piece carriage, or by introducing a previously manufactured sliding element.

Preferably, the cylindrical leadthroughs in the bearing elements have a gap-shaped opening in the cylinder surface in the longitudinal direction thereof. It may be so wide that the bearing elements can be mounted on the guide portions from the side, so that mounting from the end thereof is not necessary.

Preferably, the guide portions are formed in one piece with the rail body. If the sliding rail arrangement is to be mounted on a flat face or on cross-members, the supporting faces of which lie in one plane, the axes of the guide portions are preferably offset in the direction away from the flat face, so that the bearing elements which have been placed on the guide portion are spaced apart from the flat face and therefore being movable. Otherwise, it is also possible to provide the guide portions of the same height as the rail body, which makes a particularly flat construction possible.

In order to facilitate the manual operation of the pivot lever, the long portion of the pivot lever is provided with a handle in the vicinity of its end, so that it can easily be gripped by a user with the entire hand. This handle may be manufactured, for example, from an elastic material, be able to be placed on the pivot lever, and be provided with a profiled surface, or alternatively be formed in one piece at the pivot lever.

In order to enlarge the contact face between the short portion of the pivot lever and the cylinder face of the guide portion, advantageously the pressure application side may be provided with a fluting which is adapted to the cylinder face of the first guide portion which may be considered for the contacting. In this case too, preferably an elastic element is arranged between the end of the pivot lever and the cylinder face of the guide portion.

Compared with the known devices, the subject of the invention is distinguished in that the long arm of the pivot lever can be grasped and operated easily with one hand. The operating state of the brake can also be easily recognized from a greater distance, because when the brake is activated the pivot lever occupies a predefined position, in particular it protrudes laterally from the sliding rail arrangement. On the other hand, when the brake is released the pivot lever is in a predefined second position, in particular close to the sliding rail arrangement, and does not hinder the displacement of the units mounted on the carriage body.

The invention furthermore relates to a carriage for a sliding bearing arrangement according to the invention. The carriage is formed corresponding to a rail, which has a rail body extending in a longitudinal direction on which are provided two cylindrical guide portions extending in the longitudinal direction and spaced apart from one another in a transverse direction, which guide portions are connected to the rail body in each case by way of a connection region. The carriage has a carriage body extending in the transverse direction, on which are provided bearing elements, of which at least one is associated with a first one of the guide portions and at least one further one is associated with a second one of the guide portions, the bearing elements each having a cylindrical leadthrough corresponding to the guide portion which is associated with them, with a longitudinal gap to allow the connection region to pass through, with sliding elements being arranged in the leadthroughs and forming in the respective leadthrough a sliding contact face which in the intended mounting position, i.e., when used in a sliding bearing arrangement according to the invention, lies against the guide portion associated therewith in each case. According to the invention, a first one of the bearing elements is formed to receive the first guide portion in its leadthrough in the mounting position. The carriage has a holding portion offset in the longitudinal direction in relation to the first bearing element, which holding portion is provided with a bearing in which the pivot axle of a pivot lever is borne. The pivot lever is pivotable out of a first position into a second position with a pivoting movement through at least 45°, in particular at least 60°, in particular through 90° about the pivot axle. The pivot lever has at one side of the pivot axle a short portion formed as a pressure application portion, and at the other side of the pivot axle a long portion formed as an actuating portion. The pressure application portion is movable by the pivoting movement next to the first bearing element and in the first position presses with a pressure application side in the mounting position on a surface of the first guide portion and inhibits the displacement of the carriage relative to the rail in the intended mounting position, whereas in the second position in the mounting position it is detached from the surface of the guide portion. Particularly preferably, the pivot axle in the transverse direction is arranged outside the leadthrough of the first bearing element and is arranged at a side of this leadthrough which points away in the transverse direction from the further bearing element associated with the second guide portion. The pivot axle is thus arranged outside the leadthrough of the first bearing element both in the transverse direction and in the longitudinal direction, and preferably arranged outside the extent of the carriage body in the transverse direction. The carriage may have further features, which are described in conjunction with a sliding bearing arrangement according to the invention. Further, a sliding bearing arrangement according to the invention and a carriage according to the invention may have features which are described in conjunction with generic sliding bearing arrangements or carriages.

The invention has many applications. Examples are vehicle manufacturing, in particular of utility vehicles such as tractors and cleaning vehicles, in which the seat of the driver and also the operator controls of the cockpit are intended to be arranged first on the left, and then on the right, in order to allow the driver an unhindered view of the work area. The seat and operator controls can then be shifted very easily from left to right and back again. The adjustment of center armrests in vehicles is also easily possible with the device according to the invention. Finally, mention should also be made of the adjustment of blackboards vertically and horizontally. The invention can also be applied in production lines of the processing industry, for example, if what is important is exchanging one tool for another in an assembly line.

The invention will now be discussed in detail with reference to the appended drawings.

Figure 4:
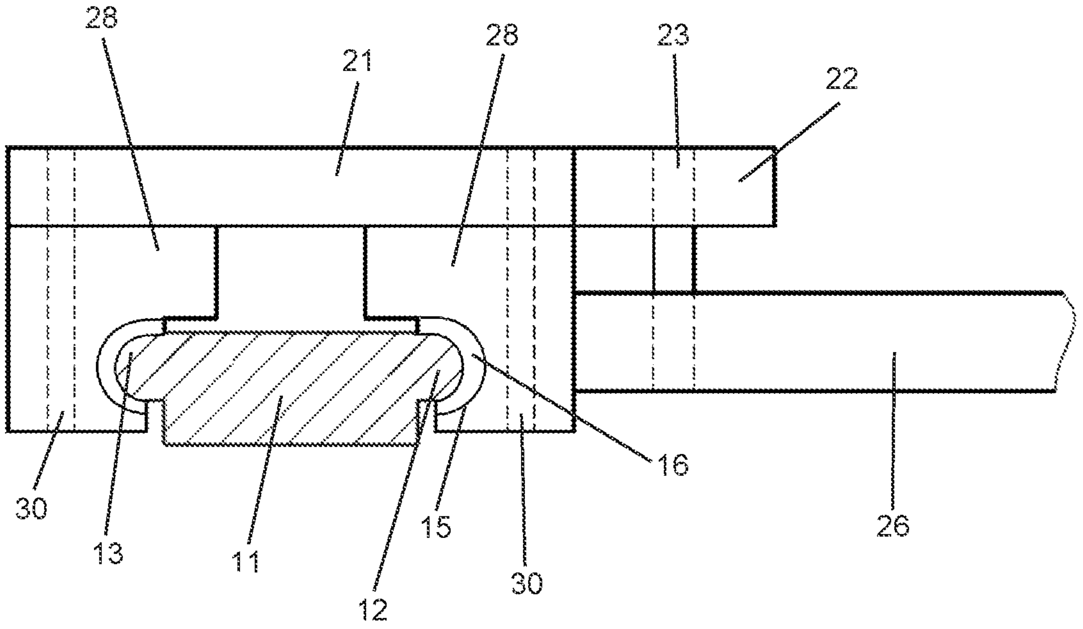

These show:

FIG. 1: a schematic representation of a bottom view of an embodiment of the sliding bearing arrangement according to the invention in the first position of the pivot lever;

FIG. 2: a schematic representation of a top view of the embodiment of FIG. 1 in the second position of the pivot lever;

FIG. 3: a schematic representation of a bottom view of the embodiment of FIG. 1 in the first position of the pivot lever;

FIG. 4: a schematic representation of a section through the embodiment of FIG. 1 along the line A-A in FIG. 3.

In FIG. 1 there can be seen a sliding bearing arrangement 1 according to the invention, with a rail 10 and a carriage 20. The rail 10 has a rail body 11 which is adjoined laterally by guide portions 12, 13 of cylindrical cross-section which extend lengthwise with the rail body 11. The carriage 20 is arranged displaceably (in the plane of the figure from right to left and back again) on the rail 10. In this view, we see the substantially rectangular carriage body 21 with a holding portion 22 formed as a substantially triangular projection, in which holding portion the pivot axle 23 of the pivot lever 24 is accommodated in a bore and divides the pivot lever 24 into a short portion 25 and a long portion 26. This pivot axle 23 may be embodied, for example, by a screw with a nut or by a rivet. The upper side, not visible here, of the carriage body 21 is available for receiving the units to be moved by the sliding bearing arrangement. At the underside of the carriage body 21 there are fastened bearing elements 28 (in this case four), in each case close to the corners of the carriage body 21, for example from the upper side of the carriage body 21 with screws, not visible here. These bearing elements 28 encompass the guide portions 12, 13 with cylindrical leadthroughs so that they can slide on said guide portions. The cylindrical leadthroughs of the bearing elements 28 are lined with sliding elements, not visible here. Thus, the entire carriage is fastened slidably on the rail 10. In this illustration, the pivot lever 24 is in the first position, i.e., in the present case oriented perpendicularly to the first guide body 12. The pivot lever has a short portion 25 and a long portion 26, which meet at the pivot axle.

Between the bearing elements 28 associated with the first guide portion 12 there is stretched an elastic element 31 which is fastened to the bearing elements, here using countersunk screws 32. This elastic element 31 spans the end face 29 of the short portion 25 of the pivot lever 24 and is pressed thereby against the first guide portion 12, so that the carriage 20 is secured against displacement on the rail 10.

It is clear already from this figure that this securing of the carriage 20 can be cancelled out if the pivot lever 24 is moved in the direction of the second position. For then the pressure application side 29 of the short portion 25 of the pivot lever 24 detaches from the elastic element 31, due to the elasticity of the latter it detaches from the first guide portion 12, and the carriage 10 is now movable.

In the top view of FIG. 2, the sliding rail 10 is now illustrated under the carriage 20. The sliding rail 10 again shows the rail body 11 and also the first guide portion 12 and the second guide portion 13. The carriage body shows the fastening bolts 30 for the bearing elements 28 which are attached to its underside and the holding portion, formed as a projection 22, with the pivot axle 23. The pivot lever 24 is now in the second position, in which it is oriented parallel to the sliding rail 10. In this position, its short portion 25 does not contact the first guide portion 12, and the carriage 20 can be displaced on the sliding rail 10. Because the pivot lever 24 is now close to the sliding rail, the movement of the carriage 20 cannot be stopped by any obstacles in the vicinity of the rail 10. The screw holes 14 serve to fasten the rail body 11 to a support, not shown. The elastic element 31 is here partially concealed by the carriage body 21 with the holding portion 22. Its ends are fastened to the carriage body using countersunk screws.

FIG. 3 shows the sliding rail arrangement according to the invention in the first position of the pivot lever 24, i.e., with the carriage 20 being locked against the sliding rail 10. In this case the pivot lever 24 points perpendicularly away from the sliding rail 20, so that the locked position of the sliding rail arrangement is recognizable immediately even from a certain distance.

FIG. 4 is a side view of the sliding rail arrangement according to the invention as produced by a section along the line A-A in FIG. 3, the carriage 20 being illustrated in a side view. There can be seen the bearing elements 28, with their cylindrical leadthroughs 15, fastened on the carriage body 21 by screws 30. In these leadthroughs are borne the corresponding cylindrical guide portions 12, 13 formed at the rail body 11, with the surface of the leadthroughs being provided with sliding bodies 16 to reduce the friction and wear. The carriage body 21 is provided with the holding portion or projection 22, in which the pivot axle 23 for the pivot lever 24 is located, from which here the long portion 26 points over to the right from the sliding rail arrangement.

LIST OF REFERENCE CHARACTERS

1 sliding rail arrangement
10 rail
11 rail body
12 first guide portion
13 second guide portion
14 screw holes
15 leadthrough
16 sliding element
20 carriage
21 carriage body
22 holding portion
23 pivot axle
24 pivot lever
25 short portion of the pivot lever
26 long portion of the pivot lever
27 handle
28 bearing elements
29 pressure application side of the short portion
30 screws for fastening the bearing elements
31 elastic element
32 screws

The invention claimed is:

1. A sliding bearing arrangement (1) comprising a rail (10) and a carriage (20), wherein the rail (10) comprises a rail body (11) extending in a longitudinal direction (X), on which two cylindrical guide portions (12, 13) extending in the longitudinal direction (X) and spaced apart from one another in a transverse direction are provided, which guide portions each are connected to the rail body (11) by way of a connection region, wherein the carriage (20) comprises a carriage body (21) extending in the transverse direction along the rail body (11), on which carriage body bearing elements (28) are provided, of which at least one is associated with a first one of the guide portions (12) and at least one further one is associated with a second one of the guide portions (13), wherein the bearing elements (28) each comprise a cylindrical leadthrough (15) corresponding to one of the guide portions (12, 13) which is associated with the respective one of the bearing elements (28), with a longitudinal gap to allow the connection region to pass through, wherein sliding elements (16) are arranged in the leadthroughs (15) which in the respective leadthrough (15) form a sliding contact face which in the mounting position lies against the guide portion (12, 13) associated therewith, wherein a first one of the bearing elements (28) is associated with the first guide portion (12), wherein the carriage (20) comprises a holding portion (22) which is provided with a bearing in which a pivot axle (23) of a pivot lever (24) is borne, wherein the pivot lever (24) is pivotable out of a first position into a second position with a pivoting movement through at least 45° about the pivot axle, wherein the pivot lever (24) comprises at one side of the pivot axle (23) a short portion (25) formed as a pressure application portion and at the other side of the pivot axle (23) a long portion formed as an actuating portion, wherein the pressure application portion (25) is arranged offset in the longitudinal direction relative to the first bearing element (28) and, by the pivoting movement, is movable in a position offset, with regard to the longitudinal direction, the first bearing element (28) and in the first position presses with a pressure application side (29) on a surface of the first guide portion (12) spaced apart from the leadthrough (15) of the first bearing element (28) with regard to the longitudinal direction and inhibits the displacement of the carriage, and in the second position is detached from the surface of the first guide portion (12).

2. The sliding bearing arrangement (1) according to claim 1, wherein a second one of the bearing elements (28) is arranged on the carriage body (21) spaced apart from the first bearing element (28) in the longitudinal direction (X) and likewise is associated with the first guide portion (12), wherein the pressure application portion (25) is provided in the longitudinal direction (X) between the first bearing element and the second bearing element (28) and the pressure application portion (25) is movable by the pivoting movement between the first bearing element and second bearing element which are spaced apart in the longitudinal direction.

3. The sliding bearing arrangement (1) according to claim 1, wherein the surface of the first guide portion (12) is a longitudinal side, pointing in the transverse direction, of the first guide portion (12), which longitudinal side points away from the second guide portion (13).

4. The sliding bearing arrangement (1) according to claim 1, wherein the pivot axle is arranged in the transverse direction outside the rail (10).

5. The sliding bearing arrangement (1) according to claim 1, wherein the pivot lever (24) in the first position is oriented perpendicularly to the first guide portion (12) and in the second position is oriented parallel to the first guide portion (12).

6. The sliding bearing arrangement (1) according to claim 1, wherein the sliding elements (16) include a low-friction plastics material.

7. The sliding bearing arrangement (1) according to claim 1, wherein the sliding elements (16) are hollow cylinders.

8. The sliding bearing arrangement (1) according to claim 1, wherein in the transverse direction between the pressure application portion (25) of the pivot lever (24) and the surface of the guide portion an elastic element (31) is provided, which is fastened to the pressure application side (29) of the pivot lever and/or is fastened at least to the carriage body (21) or to the first bearing element (28) and extends from the latter in the longitudinal direction beyond the pressure application portion (25), wherein, in the first position of the pivot lever (24), the elastic element (31) is pressed by the pressure application portion (25) of the pivot lever (24) against the surface of the first guide portion (12).

9. The sliding bearing arrangement (1) according to claim 8, wherein the elastic element comprises a foil made of an elastomer.

10. The sliding bearing arrangement according to claim 1, wherein the bearing elements are connected detachably to the carriage body.

11. The sliding bearing arrangement (1) according to claim 1, wherein the guide portions are formed in one piece with the rail body.

12. The sliding bearing arrangement (1) according to claim 1, wherein the rail consists of a metal or a plastics material.

13. The sliding bearing arrangement (1) according to claim 1, wherein the actuating portion of the pivot lever includes a handle.

14. The sliding bearing arrangement (1) according to claim 1, wherein the pressure application side (29) of the pressure application portion of the pivot lever is provided with a fluting which is adapted to a cylinder face of the first guide portion.

15. The sliding bearing arrangement (1) according to claim 1, wherein the surface of the first guide portion (12) is a longitudinal side, pointing in the transverse direction, of the first guide portion (12), which longitudinal side points away from the second guide portion (13), wherein in the first position the pressure application side (29) presses against the surface in the transverse direction.

16. The sliding bearing arrangement (1) according to claim 1, wherein the sliding elements (16) include a tribological polymer.

17. The sliding bearing arrangement (1) according to claim 1, wherein the sliding elements (16) are formed as hollow cylinders interrupted by a slot running through in the longitudinal direction.

18. A carriage (20) for a sliding bearing arrangement (1), wherein the carriage (20) is configured for a rail (10) which comprises a rail body (11) extending in a longitudinal direction (X), on which two cylindrical guide portions (12, 13) extending in the longitudinal direction (X) and spaced apart from one another in a transverse direction are provided, which guide portions each are connected to the rail body by way of a connection region, wherein the carriage (20) comprises a carriage body (21) extending in the transverse direction, on which bearing elements (28) are provided, of which at least one is associated with a first one of the guide portions (12, 13) and at least one further one is associated with a second one of the guide portions, wherein the bearing elements (28) each comprise a cylindrical leadthrough (15), corresponding to one of the guide portions (12, 13) with a longitudinal gap to allow the connection region to pass through, wherein sliding elements (16) are arranged in the leadthroughs (15) and in the respective leadthrough form a sliding contact face which in the intended mounting position lies against the guide portion (12, 13) associated therewith, wherein a first one of the bearing elements (28) is formed to receive the first guide portion (12, 13) in its leadthrough (15) in the mounting position, wherein the carriage (20) comprises a holding portion (22) offset in the longitudinal direction (X) in relation to the first bearing element (28), which holding portion is provided with a bearing in which a pivot axle (23) of a pivot lever (24) is borne, wherein the pivot lever (24) is pivotable out of a first position into a second position with a pivoting movement through at least 45° about the pivot axle (23), wherein the pivot lever (24) comprises at one side of the pivot axle (23) a short portion (25) formed as a pressure application portion and at the other side of the pivot axle a long portion (26) formed as an actuating portion, wherein the pressure application portion (25) is movable by the pivoting movement in a position offset, with regard to the longitudinal direction, the first bearing element (28) and in the first position presses with a pressure application side (29) in the mounting position on a surface of the first guide portion (12, 13) spaced apart from the leadthrough (15) of the first bearing element (28) with regard to the longitudinal direction and inhibits the displacement of the carriage (20), and in the second position in the mounting position is detached from the surface of the guide portion (12, 13).

19. The carriage (20) according to claim 18, wherein the pivot axle is arranged in the transverse direction outside the leadthrough of the first bearing element (28) and is arranged at a side of this leadthrough (15) which points away in the transverse direction from the further bearing element (28) associated with the second guide portion (12, 13).

20. A sliding bearing arrangement (1) comprising a rail (10) and a carriage (20), wherein the rail (10) comprises a rail body (11) extending in a longitudinal direction (X), on which two cylindrical guide portions (12, 13) extending in the longitudinal direction (X) and spaced apart from one another in a transverse direction are provided, which guide portions each are connected to the rail body (11) by way of a connection region, wherein the carriage (20) comprises a carriage body (21) extending in the transverse direction along the rail body (11), on which carriage body bearing elements (28) are provided, of which at least one is associated with a first one of the guide portions (12) and at least one further one is associated with a second one of the guide portions (13), wherein the bearing elements (28) each comprise a cylindrical leadthrough (15) corresponding to one of the guide portions (12, 13) which is associated with the respective one of the bearing elements (28), with a longitudinal gap to allow the connection region to pass through, wherein sliding elements (16) are arranged in the leadthroughs (15) which in the respective leadthrough (15) form a sliding contact face which in the mounting position lies against the guide portion (12, 13) associated therewith, wherein a first one of the bearing elements (28) is associated with the first guide portion (12), wherein the carriage (20) comprises a holding portion (22) which is provided with a bearing in which a pivot axle (23) of a pivot lever (24) is borne, wherein the pivot lever (24) is pivotable out of a first position into a second position with a pivoting movement through at least 45° about the pivot axle, wherein the pivot lever (24) comprises at one side of the pivot axle (23) a short portion (25) formed as a pressure application portion and at the other side of the pivot axle (23) a long portion formed as an actuating portion, wherein the pressure application portion (25) is arranged offset in the longitudinal direction relative to the first bearing element (28) and, by the pivoting movement, is movable beside, with regard to the longitudinal direction, the first bearing element (28) and in the first position presses with a pressure application side (29) on a surface of the first guide portion (12) and inhibits the displacement of the carriage, and in the second position is detached from the surface of the first guide portion (12), wherein a second bearing element (28) is arranged on the carriage body (21) spaced apart from the first bearing element (28) in the longitudinal direction (X) and likewise is associated with the first guide portion (12), wherein in the transverse direction between the pressure application portion (25) of the pivot lever (24) and the surface of the guide portion an elastic element (31) is provided, which is fastened to the pressure application side (29) of the pivot lever and/or is fastened at least to the carriage body (21) or to the first bearing element (28), the elastic element (31) extends from the latter in the longitudinal direction beyond the pressure application portion (25), the elastic element (31) spans the space between the first and second bearing elements (28) and the pressure application portion (25) of the pivot lever (24), and the elastic element (31) is fastened to the first and second bearing elements (28).

* * * * *